United States Patent [19]

Lux

[11] 3,995,161

[45] Nov. 30, 1976

[54] AUTOMATIC X-RAY EXPOSURE DEVICE INCORPORATING AUTOMATIC DESIRED MEASURING FIELD SELECTION

[75] Inventor: Peter Lux, Hamburg, Germany

[73] Assignee: U.S. Philips Corporation, New York, N.Y.

[22] Filed: Mar. 11, 1975

[21] Appl. No.: 557,326

[30] Foreign Application Priority Data

Mar. 12, 1974 Germany ........................... 2411630

[52] U.S. Cl. ........................... 250/416 TV; 250/402

[51] Int. Cl.[2] .......................................... G03B 41/16

[58] Field of Search ............ 250/416, 402, 409, 322

[56] References Cited

UNITED STATES PATENTS

| | | | |
|---|---|---|---|
| 2,829,273 | 4/1958 | Fransen | 250/322 |
| 3,546,461 | 12/1970 | Craig | 250/416 |
| 3,854,096 | 12/1974 | Hermeyer | 250/402 |
| 3,860,821 | 1/1975 | Barrett | 250/416 |
| 3,894,235 | 7/1975 | Franke | 250/402 |
| 3,902,069 | 8/1975 | Skarke et al. | 250/402 |

*Primary Examiner*—Alfred E. Smith
*Assistant Examiner*—B. C. Anderson
*Attorney, Agent, or Firm*—Frank R. Trifari; Ronald L. Drumheller

[57] ABSTRACT

The invention relates to an automatic X-ray exposure device having a measuring member, for example, an ionization chamber comprising a large number of measuring fields, for example, 5 × 5. Each measuring field is associated with a capacitor which, during television fluoroscopy, receives the part of the video signal which is derived from the part of the television image in which the dose or the dose power is to be measured in the associated measuring field. Therefore, the capacitors having the highest and the lowest voltage, respectively, have associated therewith the measuring fields having the largest and the smallest, respectively, dose or dose power. Subsequently, the measuring fields whose dose or dose power is situated in a given organ-dependent range between a maximum and a minimum value are determined and actuated for the automatic exposure in a subsequent exposure.

2 Claims, 3 Drawing Figures

AUTOMATIC X-RAY EXPOSURE DEVICE INCORPORATING AUTOMATIC DESIRED MEASURING FIELD SELECTION

The invention relates to an automatic X-ray exposure device, comprising a measuring member comprising a number of measuring fields, a comparator for comparing the doses or dose powers each time measured in all measuring fields, and means for automatically switching off the measuring fields not exposed to the X-radiation and for switching on the measuring fields relevant to the exposure.

In the commonly used automatic X-ray exposure devices, the radiologist must choose the measuring fields of the measuring member wherein the dose behind the object is to be measured. It is important that each time the measuring field is selected which is situated behind the area of the patient which is most important for the diagnosis.

Having to choose a measuring field which is suitable for the automatic exposure, actually detracts the radiologist from his real function. Moreover, there are given kinds of exposures where the arrangement of the measuring fields is not optimum, because the areas most important for the diagnosis in given circumstances are situated in front of the part of the ionization chamber where no measuring field is present. This could be remedied by increasing the number of measuring fields, but this would make the choice of a suitable measuring field more difficult yet.

An automatic X-ray exposure device incorporating automatic selection of the desired measuring field is already known. Therein, during the first part of an exposure the dose or the dose power of all measuring fields (of which there may be a comparatively large number present, for example, 3 × 3, because the desired measuring field is not to be selected by the operator) is measured. The measuring field exhibiting the lowest dose or dose power (in the case of exposure of bones) or the measuring field exhibiting the lowest dose but one (in the case of exposure of soft parts) is then used for the automatic exposure, while all other measuring fields are deactivated. Measuring fields which are each time not at all struck or only partly struck by X-radiation because of the suppression of the X-ray beam are then each time switched off in advance.

It is assumed that in the case of exposure of bones the desired measuring field is situated behind the bone and that the dose power is lowest at this area; it is furthermore assumed that in the case of exposures of soft parts (for example, lung exposure) the dose power in the part of the image which is important for the diagnosis is slightly higher than in the other part of the image, for example, behind the ribs or the spinal column.

It is a drawback that the gradiation of the object, i.e. the ratio between the maximum and the minimum dose power or dose behind the object, has no effect on the automatic exposure. This must automatically give rise to incorrect exposures, notably in the case of exposure of soft parts. This is probably also the reason why this known automatic X-ray exposure device has not yet been applied in practice.

The present invention has for its object to realize an automatic X-ray exposure device having a measuring member comprising a series of measuring fields such that automatic selection of the desired measuring field is possible, without giving rise to incorrect exposures.

To this end, an automatic X-ray exposure device of the kind set forth according to the invention is characterized in that it comprises a device for finding a maximum and a minimum dose or dose power measured in the measuring fields, and a device for determining and switching on the measuring fields in which a dose or dose power is measured in a predetermined range between the maximum and the minimum value.

The range between the maximum value and the minimum value is chosen such that for the automatic exposure only the measuring fields in which a dose or dose power is measured which is situated in a small range about the geometrical mean value of the maximum and the minimum dose are made effective; if the film is exposed such that at the area of these measuring fields a mean density occurs, a correctly exposed exposure is obtained. This is applicable at least if the gradation of the object can be coped with by the film used.

In practice it may occur, however, notably when the voltage applied to the X-ray tube is too low, that the gradation of the object cannot be coped with by the film, so that under given circumstances details which are important for the diagnosis are not displayed. This can be avoided by adapting the said range between the maximum and the minimum value each time to the object to be exposed, so that, for example, in the case of bone exposures the range is nearer to the minimum value of the dose or the dose power than in the case of exposure of soft parts. In an automatic X-ray exposure device for an X-ray generator incorporating "programmed exposure technique" in which the exposure data required for a given organ are stored in a presetting unit and can be fetched by depression of a button, this adaptation can be simplified by providing the presetting unit with means for presetting a dose margin or dose power margin within which a dose or dose power to be measured in the measuring fields to be switched on by the automatic exposure device is situated between the minimum and the maximum value. For each organ to be examined the range between the maximum value and the minimum value within which the dose or dose power to be measured in the measuring fields to be switched on for the automatic exposure must be situated is thus preprogrammed like other exposure data, for example, the tube voltage, the density etc.

Like in the known automatic X-ray exposure devices, it is in principle possible to measure the dose or the dose power during the exposure, and to use the measuring field whose measured dose or dose power is situated in the desired range between the maximum value and the minimum value for the automatic termination of the exposure. However, this requires very fast-acting electronics if very short exposure times (1 ms) are also to be realized. In an automatic X-ray exposure device for an X-ray apparatus comprising a television system. The use of such fast electronics can be avoided by associating with each measuring field a capacitor which stores a mean video signal amplitude in a part of the television image which is associated with the measuring field in a spatial sense, voltages generated across these capacitors controlling devices for determining the minimum and the maximum dose or dose power, and also for determining the measuring fields to be switched on for an exposure. The automatic selection of the desired measuring field is thus effected during fluoroscopy. The exposure itself is terminated in known manner when the dose measured in the actuated measuring field or measuring fields reaches a predetermined value.

For the automatic selection of the desired measuring field a capacitor is thus associated with each measuring field. Each capacitor is charged by a video signal component belonging to the relevant part of the television image in which each time the dose or the dose power is measured in the measuring field such that the charging current is proportional to the instantaneous value of the video signal. The voltage across the capacitor is then proportional to the mean value of the video signal in the part of the television image in which the dose is measured in the measuring field during an exposure. The voltage across the capacitors is, therefore, a measure for the dose measured during an exposure and integrated via the area of a measuring field. By comparison of the voltages on the various capacitors, the maximum and the minimum values can be found. From these values, the capacitors can be found which have a voltage in the desired range between the minimum and the maximum value. The measuring fields associated with these capacitors are switched on for the automatic subsequent exposure.

In practice it may occur that some measuring fields are directly exposed to the X-radiation. In these measuring fields a very high dose or a very high dose power is then measured, and incorrect exposures will occur if the measuring values of these measuring fields are not taken into account in the automatic selection of the desired measuring field. These incorrect exposures, however, can be avoided in an automatic X-ray exposure device for an X-ray apparatus comprising a television system by including a peak value meter which stores the video signal amplitude corresponding to the maximum value of the dose or the dose power the capacitors or measuring fields being switched off whose associated video signal component is only slightly smaller than the stored peak value for a substantial period of time. In this respect it is assumed that at the areas of the image which are directly exposed to X-radiation the video signal reaches substantially the maximum video signal amplitude which can be obtained by peak value rectification. The capacitors whose associated measuring fields are exposed to the direct radiation to a substantial degree, for example, for 25%, can be found in that each capacitor is each time charged by a direct current source when the video signal of the part of the television image associated with this capacitor exceeds a threshold value which is not below the maximum video signal amplitude. A capacitor whose associated measuring field is not exposed to direct radiation is not charged. However, a capacitor whose associated measuring field is exposed to direct radiation, is charged and the voltage generated by the charging is dependent of the part of the part of the measuring field surface area which is exposed to direct radiation.

It may thus be assumed that all capacitors whose voltage exceeds a predetermined threshold value are associated with a measuring field whose measuring field whose measuring area is directly exposed to X-radiation for at least a given portion. These capacitors and the associated measuring fields are deactivated for the automatic selection of the desired measuring field.

The invention will be described in detail hereinafter with reference to an embodiment according to the invention which is shown in the drawing.

The embodiment according to the invention concerns an automatic X-ray exposure device for an X-ray examining apparatus comprising a television system in which the fluoroscopic image is picked up by a television camera. The information as regards which locations are relevant for an exposure is obtained from fluoroscopy prior to an exposure. As will be described in detail hereinafter, the information as regards the position of the important parts of the image which determine the exposure is obtained from the video signal of the television camera. This information serves to switch various measuring fields in the beam path on or of. The switched-on measuring fields serve to determine the switch-off instant and hence the correct film density. For the measuring member use can be made, for example, of an ionization chamber comprising measuring fields arranged in form of a matrix. The dose or the dose power at the area of the measuring fields, where-ever, can also be measured by means of PbO ionization chambers or by means of $HgJ_2$ crystals which are sensitive to X-radiation behind a film cassette. In the so-termed 70-mm or 100-mm exposure technique, in which the screen image of an X-ray intensifier is photographed, a matrix of photoelements can measure the image brightness and hence the dose power by means of an image distributor.

In the embodiment according to the invention, a measuring member comprising 5 × 5 measuring fields is used. The measuring fields should be rectangular and of the same size. A capacitor is associated with each measuring field, and the charge condition of the capacitor is influenced by the video signal which is associated with the part of the X-ray image in which the measuring field for the dose or the dose power is situated. The charging condition of each capacitor, therefore, can be used as a measure for the dose or the dose power in the associated measuring field.

Figure 1:
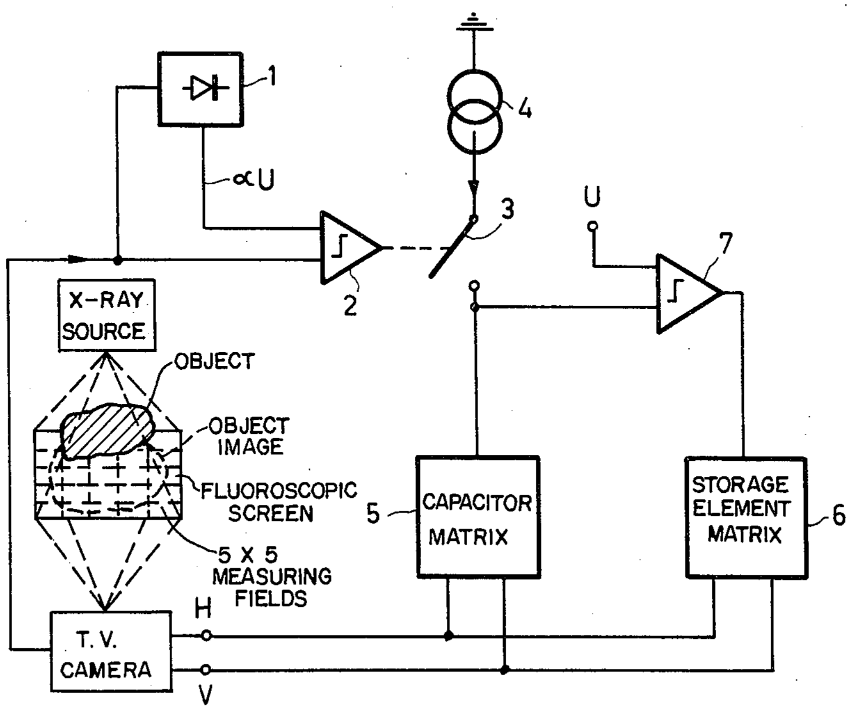
FIG. 1 shows the part of the automatic exposure device according to the invention which serves to find the capacitors which are associated with a measuring field which is at least partly exposed to direct radiation.

FIG. 1 shows a circuit arrangement for finding the measuring fields which are partly or completely exposed to direct X-radiation. The circuit comprises a peak rectifier 1 which calculates the maximum amplitude of the video signal during a first frame. The video signal should be applied to the peak rectifier with a polarity such that a high dose power corresponds to a high video signal amplitude, and that a low dose power corresponds to a low video signal amplitude; to this end, the video signal may have to be inverted. The maximum amplitude $U_{max}$ of the video signal thus found is applied, via a voltage divider which is not shown, to one input of a comparator 2 which thus carries a voltage which correspond to a fraction $\alpha$ of the maximum amplitude $U_{max}$. $\alpha$ is only slightly smaller than 1, for example. 0.95.

During a subsequent frame the video signal is applied to the other input of the comparator 2, and each time when the instantaneous value of the video signal exceeds the value $\alpha$. $U_{max}$, the comparator 2 closes an electronic switch 3 which connects a current source 4 to a capacitor matrix 5. This capacitor matrix comprises the capacitors associated with the measuring fields. Always only one of the capacitors of the capacitor matrix is switched on, i.e. in synchronism with the video signal when the video signal scans an area of the television image which corresponds to the position of the associated measuring field during an exposure. The actuation of the capacitors of the capacitor matrix 5 is effected by the horizontal and the vertical synchronization pulses. The horizontal and the vertical synchronization pulses, moreover, control a storage matrix which comprises a store for each capacitor of the capacitor matrix or for each measuring field, for example, in the form of a flipflop or a ferrite core. Because of the control of the storage matrix by the horizontal and the vertical synchronization pulses, the contents of a store can be modified only when the associated capacitor in the capacitor matrix 5 is switched on. The circuit shown in FIG. 1 operates as follows: if the exposure object is arranged during fluoroscopy such that the screen whose image is picked up by the television camera is not directly exposed to the X-radiation, instantaneous values of the video signal which exceed the threshold value $\alpha$; $U_{max}$ will only seldom occur. Because the switch 3 is closed only in such a case, the capaciof the capacitor matrix 5 each time connected are charged only comparatively weakly. However, when part of the screen is directly exposed to X-radiation, the part of the video signal associated with this area has an amplitude which corresponds to substantially the maximum amplitude $U_{max}$ or which is only slightly lower. The instantaneous value of the video signal then exceeds the threshold value for a comparatively long period, so that the switch 3 remains closed for a comparatively long period and the capacitor of the capacitor matrix associated with this part of the television image is charged comparatively strongly. If the voltage on the capacitor which is each time switched on exceeds a reference value $U_{ref}$, a comparator 7 which compares the voltage of the capacitor each time switched on and the reference voltage $u_{ref}$ modifies the contents of the store associated with the capacitor each time switched on such that the measuring field associated with this store is deactivated for the subsequent exposure. The voltage $U_{ref}$ is chosen such that it corresponds to a fraction, for example, 25%, of the voltage which would occur on the capacitors if the switch 3 were continuously closed. In this manner all measuring fields which are exposed to direct radiation for more than 25% can be found. These measuring fields will be known at the end of the second frame; the capacitors of the capacitor matrix 5 are subsequently discharged.

Similarly, the measuring fields can be found which are not exposed to radiation at the diaphragm of the X-ray beam chosen by the operator. To this end, during a first phase the minimum value of the video signal is determined; for this purpose the polarity of the video signal should be reversed such that a high video signal amplitude corresponds to an area of low dose power, and that a low video signal amplitude corresponds to an area of high dose power. The determination and the switching off of the measuring fields which are not exposed or only partly exposed to X-radiation is then effected in the same manner as described for the finding of the overradiated measuring field.

A further possibility of switching off measuring fields which are only partly exposed or not at all exposed to X-radiation consists in that for different diaphragm formats the measuring fields which are covered by the diaphragm setting are each time calculated by means of a computer and subsequently switched off. The remaining measuring fields are then subjected to the automatic selection process.

After the fields which are partly or fully exposed to direct X-radiation, or the measuring fields which are not or only partly exposed to X-radiation, have thus been found, the mean brightness (and hence the dose power) in the various measuring fields is determined and also the minimum value and the maximum value of the mean brightness values occurring in the various meausuring fields. To this end, the various capacitors of the capacitor matrix 5 are charged to a voltage which corresponds to the mean brightness in the relevant field.

Figure 2:
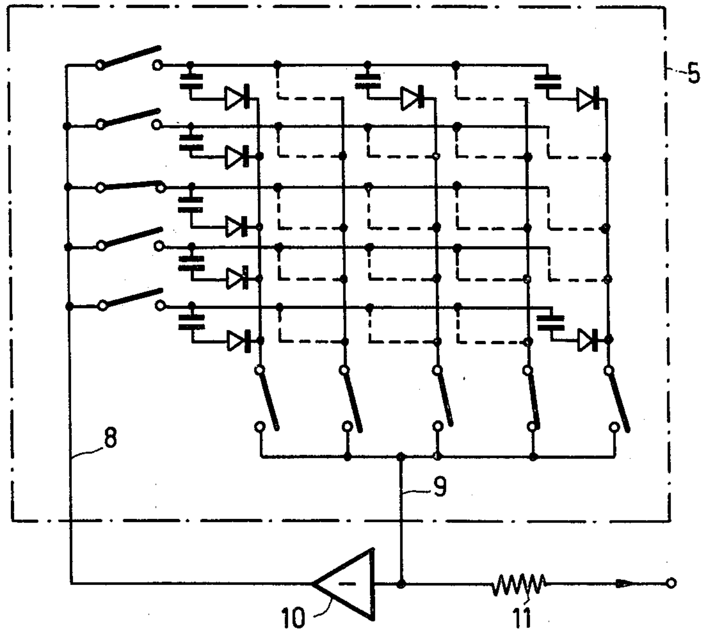
FIG. 2 shows the part of the circuit for finding the dose or the dose power measured in the various measuring fields.

The circuit required for this purpose is shown in FIG. 2. FIG. 2 inter alia shows the construction of the capacitor matrix 5 in detail. The capacitor matrix 5 consists of five rows and five columns of five capacitors each. An uncoupling diode is connected in series with each capacitor. All uncoupling diodes are connected with the same polarity. For the sake of simplicity. some capacitor elements of the matrix and the associated uncoupling diodes are denoted only by broken lines. One electrode of each capacitor is each time connected to a row conductor, whilst the other electrode is connected, via the uncoupling diode, to a column conductor. Each row conductor is connected, via a switch (row switch) to a conductor 8; each column conductor is connected, via a switch (column switch) to the conductor 9. The row switches are controlled by the vertical synchronization pulses, and the column switches are controlled by the horizontal synchronization pulses. Control is effected such that always only one row switch and one column switch are simultaneously closed.

The conductor 8 is connected to the output of an operational amplifier, the input of which is connected to the conductor 9. The operational amplifier constitutes, together with the capacitor connected between its output and the inverting input and the resistor 11, an integrating member which forms a mean value of the video signal which is stored in the capacitor.

This "writing" of the mean value of the video signal in the various capacitor elements is effected during an image frame. At the beginning of the image frame the upper row switch and the left column switch are closed. As a result, first the capacitor at the top left is charged. After approximately one fifth of the line duration, the left column switch is opened again and the second column switch from the left is closed, so that the second capacitor from the left in the upper row is charged. In this manner all column switches are opened and closed in succession during a line, so that during the first line of the television image all capacitors of the upper row are slightly charged. This process is repeated during the subsequent lines. After approximately one fifth of the image frame, i.e. after 63 image lines, the upper row switch is opened and the second row switch is closed. Analogously, the capacitors of the second row are charged in accordance with the means brightness or the mean dose power at the area of the associated measuring field. In the course of one image frame all row switches are thus successively closed and opened, so that at the end of an image frame each capacitor of the capacitor matrix 5 has been charged to a voltage which corresponds to the dose power (integrated via its measuring field) of the measuring field associated with the capacitor.

Figure 3:
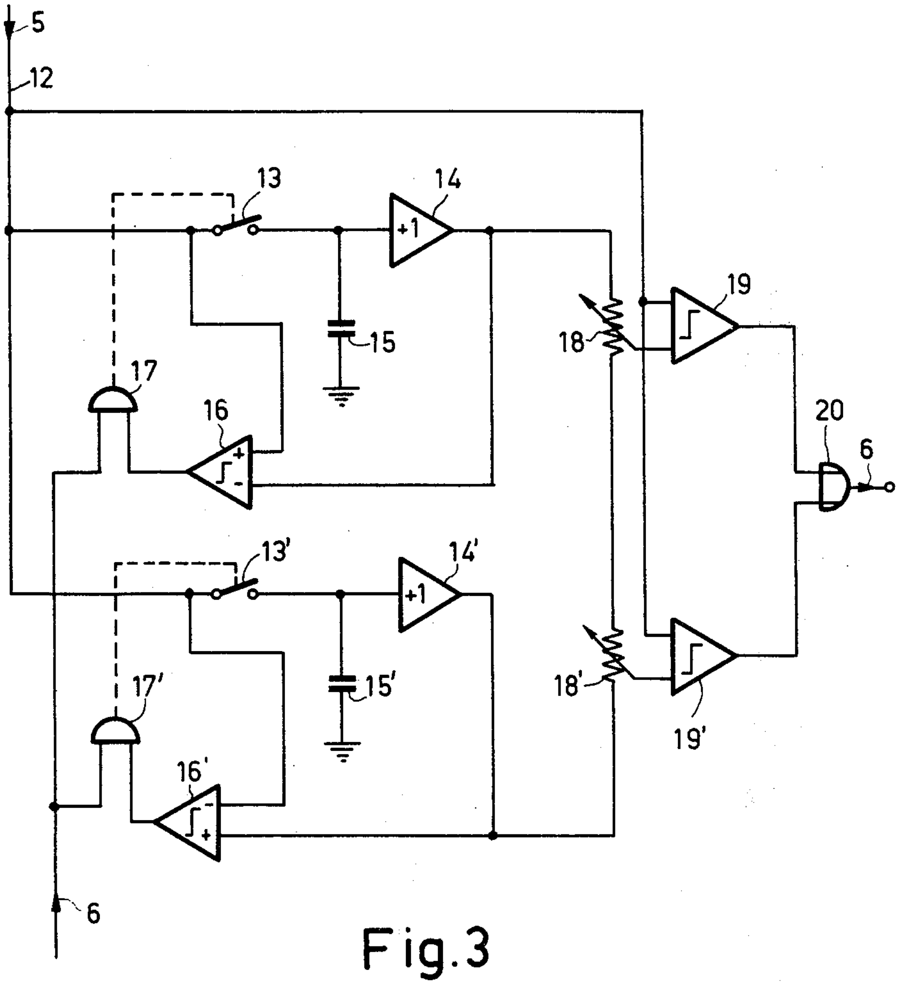
FIG. 3 shows the circuit for finding the maximum and the minimum dose or dose power measured by the measuring fields or the capacitors, and for finding the measuring fields to be activated for the exposure.

Subsequently, i.e. during the next image frame, the highest and the lowest capacitor voltage, corresponding to the highest and the lowest, respectively, dose power or dose measured in a measuring field are found. The circuit required for this purpose is shown in FIG. 3. A conductor 12 is connected to the capacitor matrix such that the charging voltages of the capacitors which are successively switched on in the rhythm of the horizontal and the vertical synchronization pulses are present thereon. The conductor 12 is connected, via a switch 13, to the input of an uncoupling amplifier 14 and, via a switch 13', to the input of an uncoupling amplifier 14'. A capacitor 15 (15') is connected parallel to the input of the uncoupling amplifier 14 (14'). The uncoupling amplifier 14 (14') has a gain +1; the input voltage and the output voltage of this amplifier are the same. The output of the amplifier 14 (14') is connected to one input of a comparator 16 (16') which generates a signal (logic L) if the voltage on this input is higher (lower) than the voltage of the other input which is directly connected to the conductor 12. The output of the comparator 16 (16')is connected to one input of an AND-gate 17 (17'), the other input of which is controlled by the storage matrix 6; the various storage elements of the storage matrix 6 are connected to this other input of the AND-gate 17 (17') in the manner in which the capacitors of the capacitor matrix are connected to the conductor 12. On this other input a logic signal "L"appears whenever the contents of the store each time switched on have not been modified thus far (a modification of this kind occurs when the measuring field associated with the store is directly exposed to the X-radiation or when this field is not at all exposed to X-radiation). The output signal of the AND-gate 17 (17') closes, as indicated by a connection line in the form of a broken line, the switch 13 (13') when the logic signal "L" is present on both inputs thereof.

The operation of the circuit is as follows: at the beginning of the image frame for the determination of the maximum and the minimum values, the capacitor 15 is discharged and the capacitor 15' is charged to a comparatively high voltage by means not shown. When the charging voltage for the first (top left, FIG. 2) capacitor appears on the conductor 12, the voltage on the output of the uncoupling amplifier 14 (14') will certainly be lower (higher) than the voltage on the conductor 12. Consequently, on the output of the comparator 16 (16') the signal "L" appears, and the switch 13 (13') is closed if on the other input of the AND-gate 17 (17') also an "L" appears, i.e. if the capacitor each time switched on is not associated with a measuring field which is directly exposed to the X-radiation or which is - at least partly - not at all exposed thereto. After the closing of the switch 13 (13'), the capacitor 15 (15') is charged to the value of the voltage on the conductor 12 (if the capacitance of the capacitors 15 and 15' is chosen to be sufficiently low, it can be achieved that the voltage on the capacitors of the capacitor matrix each time switched on does not substantially change). When the next capacitor of the capacitor matrix is then switched on, and its voltage is either higher or lower than the voltage in the previously actuated capacitor, either the switch 13 or the switch 13' is closed, with the result that the associated capacitor 15 (15') is charged to a higher or lower value, respectively. The voltage on each capacitor of the capacitor matrix is thus compared with the maximum value and the minimum value, respectively, of the voltages on the previously actuated capacitors, and its voltage is taken up either in the capacitor 15 or in the capacitor 15' if it is higher or lower than the maximum value, respectively, of the voltage on the previously actuated capacitors. At the end of the image frame, the maximum capacitor voltage of the capacitor matrix 5 is stored in the capacitor 15, and the minimum capacitor voltage is stored in the capacitor 15'.

In order to avoid object-determined dispersions, it is advantageous to determine the maximum value and the minimum value as the mean value of the three highest and the three lowest dose or dose powers, respectively. To this end, further capacitors should be connected parallel to the capacitors 15 and 15', all capacitors being actuatable by means of switches. After the extreme values have been determined in the described manner, the extreme values of the remaining capacitor voltages are then determined; for this purpose further capacitors must be switched on and off during further image frames. At the end, all capacitors are connected parallel by the closing of the switches, so that the mean value of the extreme values is formed.

During the subsequent image frame the measuring fields are determined in which during an exposure a dose power or dose is measured which lies between the minimum value and the maximum value in a predetermined range. To this end, two potentiometers 18 and 18' are connected in series between the outputs of the amplifiers 14 and 14'; from the tappings of these potentiometers voltages can be derived which represent a given fraction of the maximum value and the minimum value on the output of the amplifier 14 and 14', respectively. The two voltages are compared, by means of two comparators 19 and 19', with the voltage of the capacitor of the capacitor matrix 5 which is each time switched on. If the voltage on the conductor 12 exceeds the voltage on the tapping of the potentiometer 18 (which exceeds the voltage on the tapping of the potentiometer 18'), or is lower than the voltage on the tapping of potentiometer 18' the contents of the store associated with the capacitor each time switched on are modified via an OR-gate 20, both inputs of which are connected to the outputs of the comparators 19 and 19'; the stores are successively connected to the output of the OR-gates 20 in synchronism with the capacitors. After the voltage of all capacitors has been compared with the voltage on the tappings of the potentiometers 18 and 18', the contents of all stores associated with capacitors whose voltage lies outside the range between the maximum values adjusted by the potentiometers 18 and 18' have been modified. The measuring fields associated with these stores are switched off, and for the next exposure only the measuring fields are switched on which have stores associated therewith whose contents have not been modified. A subsequent exposure is thus determined by the measuring the fields in which a dose or dose power is measured which lies in the range between the maximum value and the minimum value determined by the adjustment of the potentiometers 18 and 18'.

Because it is very useful, as already stated, to adapt this range each time to the exposure object, in an X-ray generator for the programmed exposure technique, in which exposure data which are specific for each organ can be preset and fetched by operation of a button associated with the organ, a set of potentiometers 18 and 18' can be provided for each button. Using these potentiometers, the optimum range for the exposure of the member can thus each time be adjusted.

What is claimed is:

1. Automatic x-ray exposure apparatus for selecting measuring fields for use in determining x-ray dose comprising:

means for producing a fluoroscopic image of an object to be x-rayed, said fluoroscopic image defining a matrix of measuring fields which could be used for measuring x-ray dose;

a television camera responsive to said fluoroscopic image for producing a video signal corresponding thereto, said video signal having a portion thereof corresponding to each of said measuring fields;

a matrix of storage elements equal in number to the number of measuring fields, each of said storage elements corresponding to a different measuring field and each of said storage elements being accessible during the portion of said video signal corresponding to said different measuring field, each storage element having an unmodified and a modified state;

means for determining the maximum amplitude of said video signal and for determining the minimum amplitude of said video signal;

means for identifying the measuring fields in which the video signal portion corresponding thereto is for more than a predetermined percentage of the time at approximately said maximum amplitude, for identifying the measuring fields in which the video signal portion corresponding thereto is for more than a predetermined percentage of the time at approximately said minimum amplitude and for setting the storage elements corresponding to said identified measuring fields to said modified state;

means for determining the mean amplitude of the video signal portions corresponding to the measuring fields not so identified;

means for deriving from the highest one or more mean amplitudes a maximum value and for deriving from the lowest one or more mean amplitudes a minimum value; and means for establishing a predetermined range of mean amplitudes between said maximum and minimum values and for setting also to said modified state the storage elements corresponding to measuring fields having video signal mean amplitudes outside of said range, the measuring fields corresponding to storage elements still in the unmodified state being the selected measruing fields for use in determining x-ray dose.

2. Automatic x-ray exposure apparatus as defined in claim 1 and further comprising a matrix of capacitors equal in number to the number of measuring fields, each of said capacitors corresponding to a different measuring field and each of said capacitors being accessible during the portion of said video signal corresponding to said different measuring field, each of said capacitors during one mode of operation measuring the percentage of time during which the video signal portion corresponding thereto is at approximately said maximum or minimum amplitude and measuring during another mode of operation the mean amplitude of the video signal portion corresponding thereto.

* * * * *